United States Patent [19]
Ehrenmann

[11] Patent Number: 5,592,155
[45] Date of Patent: Jan. 7, 1997

[54] REMOTE CONTROL INFRARED RECEIVER WITH LIGHT DETECTOR AND PRE-AMPLIFIER

[75] Inventor: Daniel Ehrenmann, Rudolfstetten, Switzerland

[73] Assignee: T.L.E.E. Industrial Laser and Electronic Engineering, Switzerland

[21] Appl. No.: 189,663

[22] Filed: Feb. 1, 1994

[30] Foreign Application Priority Data

Feb. 3, 1993 [CH] Switzerland ................................ 316/93

[51] Int. Cl.$^6$ ........................................................ H04Q 7/06
[52] U.S. Cl. .................................. 340/825.72; 340/825.72; 340/825.71; 340/825.69; 359/142; 359/148
[58] Field of Search ........................... 340/825.71, 825.72, 340/825.44, 825.49, 825.69; 359/142, 148, 144, 146

[56] References Cited

U.S. PATENT DOCUMENTS

| | | | |
|---|---|---|---|
| 4,156,134 | 5/1979 | Minner | 250/199 |
| 4,241,456 | 12/1980 | Nakagaki et al. | 455/603 |
| 4,833,467 | 5/1989 | Kobayashi et al. | 340/825.64 |
| 4,850,040 | 7/1989 | Teich et al. | 455/603 |
| 5,115,236 | 5/1992 | Köhler | 340/825.69 |
| 5,239,295 | 8/1993 | DeLuca et al. | 340/825.44 |
| 5,287,210 | 2/1994 | Sefidvash | 359/147 |

FOREIGN PATENT DOCUMENTS

| | | |
|---|---|---|
| 60-157346 | 8/1985 | Japan . |
| 2245119 | 6/1990 | United Kingdom . |

OTHER PUBLICATIONS

Toute l'Electronique, No. 508, Nov. 1985, Paris, Fr. pp. 54–60.
Patent Abstracts of Japan, vol. 9, No. 325 (E–368)(2048) Dec. 20, 1985.
Patent Abstracts of Japan, vol. 11, No. 145 (E–505) May 12, 1987.
Anderson, Donald and Zavrel, Robert J. "RF ICs For Portable Communications Equipment," *Electronic Components & Applications*, vol. 7, No. 1, 1985, pp. 37–44.
*RCA Transistor Manual Technical Series SC–13* "Coupling," 1967, pp. 26–28.
*Van Nostrand's Scientific Encyclopedia* "Blocking Capacitor," Fifth Edition, p. 318.

*Primary Examiner*—Brian Zimmerman
*Assistant Examiner*—William H. Wilson, Jr.
*Attorney, Agent, or Firm*—Ostrolenk, Faber, Gerb & Soffen, LLP

[57] ABSTRACT

The remote control receiver comprises one or more photodiodes. The signal from the photodiodes is amplified and fed to a processing unit. The processing unit is based on a conventional integrated remote control receiver circuit, which is suited to process a remote control signal. Such integrated receiver circuits are, however, not designed to process a signal from a preamplifier. Rather, their input must be connected directly to a photodiode. By applying a replacement load instead of a photodiode to the input of the integrated receiver circuit, it becomes possible, however, to feed any electrical signal to the integrated circuit. In this way the signal can be filtered and amplified before being sent to the integrated circuit, which allows a considerably higher receiver sensitivity to be reached.

10 Claims, 1 Drawing Sheet

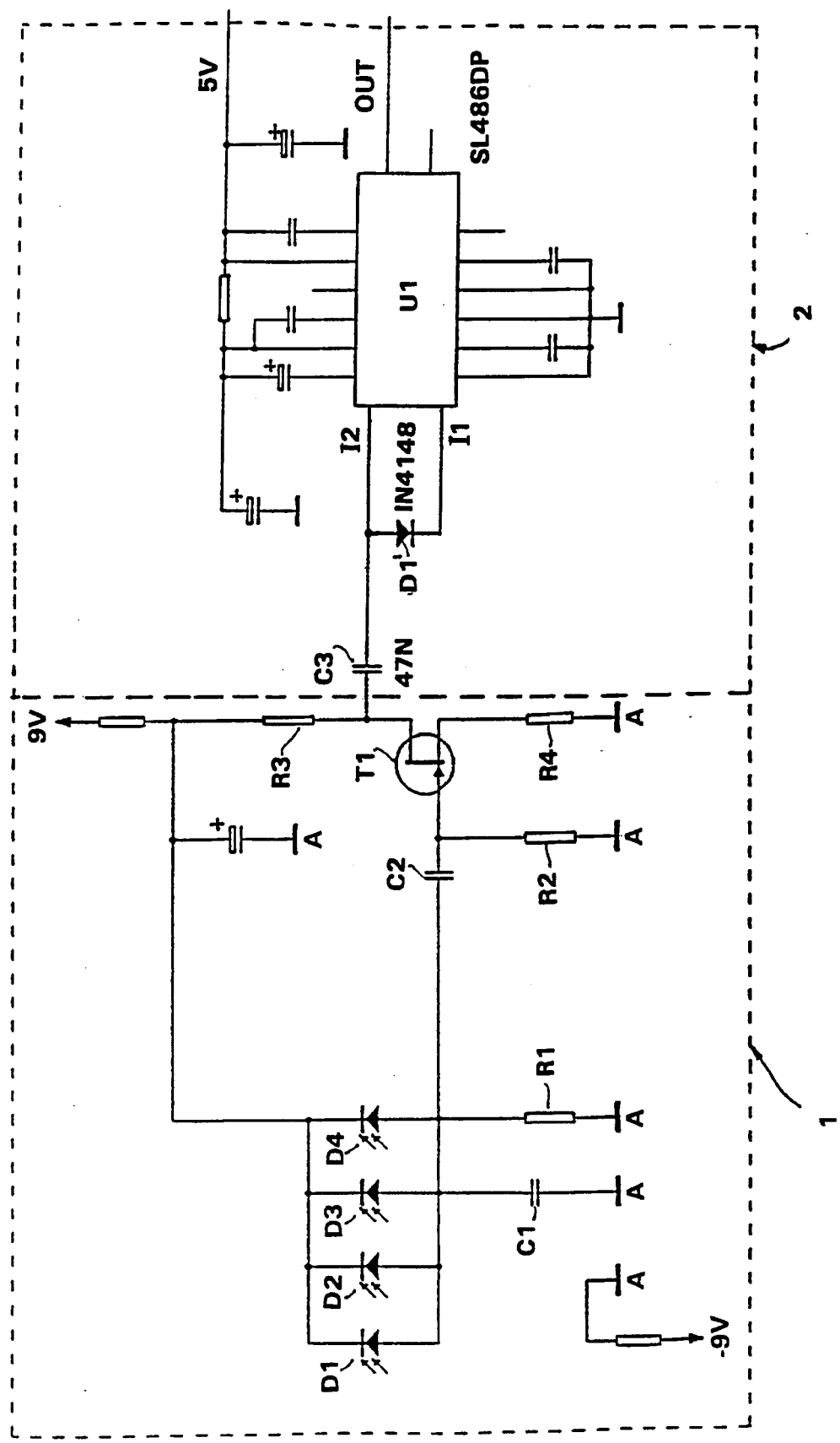

REMOTE CONTROL INFRARED RECEIVER WITH LIGHT DETECTOR AND PRE-AMPLIFIER

BACKGROUND OF THE INVENTION

1. Field of the Invention

The invention relates to a remote control receiver with an integrated remote control receiver circuit, wherein said integrated receiver circuit has an input designed to be directly connected to a light detector.

2. Description of the Prior Art

Most current remote control receivers comprise a light detector (e.g. a photo diode) for receiving the command signals, which light detector is connected to a signal processing circuit. This signal processing circuit amplifies and filters the received signal and often digitizes and even analyses the received commands. In order to achieve a desired reliability, this circuit tends to be very complicated. Therefore, it is usually part of an integrated circuit, a so called remote control IC. Such integrated circuits are offered by several manufacturers. They usually require only a few external components and have an input terminal, to which the light detector can be connected directly. An example for a receiver with such a circuit is e.g. given in "Toute l'Electronique", no.. 508, November 1985 (Paris, France) or can be found in the reference data sheets of the integrated receiver circuits.

Due to the integration of the most important circuits in a single component it is possible to provide cheap remote control receivers.

A disadvantage of the conventional systems is, however, their limited range. If the surrounding illumination is weak, the range is usually limited to not more than 10 to 20 meters if the sender is well pointed towards the receiver. If the surrounding illumination is strong, this range is reduced drastically.

SUMMARY OF THE INVENTION

Hence, it is a general object of the invention to provide a remote control receiver that avoids these disadvantages. It should have a wide range and a good sensitivity without being much more expensive than existing systems.

Now, in order to implement these and still further objects of the invention, which will become more readily apparent as the description proceeds, the remote control receiver is manifested by the features that it comprises an integrated receiver circuit, wherein said receiver circuit is designed for processing received signals and comprises an input designed for a direct connection to a least one predefined light detector operating in a detector operating range, and an input circuit, wherein an output signal of said input circuit is coupled into said input of said receiver circuit, wherein a replacement load is applied to said input of said receiver circuit, said replacement load having within said detector operating range substantially the same electric impedance as said at least one predefined light detector.

Conventional integrated receiver circuits cannot be operated without a light detector connected thereto, because their input stage would not be within its operating limits without the detector. Therefore, it seems impossible to feed the input of the integrated remote control receiver e.g. with an electric signal from a preamplifier. This problem is solved here by applying a replacement load to the input of the integrated circuit, which replacement load has an impedance substantially corresponding to the impedance that a light detector would have. In addition to this, the real input signal, e.g. from a preamplifier, is coupled into the input of the integrated circuit.

In this way it becomes possible to amplify and, if necessary, filter the signal from a light detector before feeding it to the integrated circuit.

Hence, the superior processing capabilities of the integrated circuit can be used while avoiding its limited sensitivity.

Still it is possible to keep the system compatible with existing devices. Especially, the receiver can use signals from conventional signal emitters.

The inventive device can be adapted to special environmental conditions, e.g. by suitable electronic filtering before coupling the signal into the integrated circuit, or by using detectors with special properties that would be incompatible for direct connection to the integrated circuit.

BRIEF DESCRIPTION OF THE DRAWING

The invention will be better understood and objects other than those set forth above will become apparent when consideration is given to the following detailed description thereof. Such description makes reference to the annexed drawing, which shows a circuit diagram with the essential components of an embodiment of the invention.

DESCRIPTION OF THE PREFERRED EMBODIMENTS

The receiver of the annexed drawing comprises an input circuit 1, the output signal of which is fed to the processing unit 2.

The input circuit comprises one or more infrared sensitive photo diodes D1, D2, etc. as light receivers. The signal of the photo diodes is filtered by the components R2, C1 and C2. By means of this filter, undesired signals, such as background illumination in a low frequency range as well as noise having a high frequency, are suppressed. In the preamplifier consisting of T1, R3 and R4 the filtered signal is then amplified and its impedance is matched to the following stages.

The signal is fed to the processing unit 2 by means of the capacitor C3.

The processing unit 2 consists substantially of the integrated remote control receiver circuit U1, the diode D1', the coupling capacitor C3 as well as some additional passive elements for operating U1.

The integrated remote control circuit U1 is a conventional device, such as has been mentioned above. It comprises amplifier and processing stages and generates an output signal OUT, which can be processed further. It must be pointed out that in place of the component used here (SL 486D, Plessey) one can use numerous other such integrated circuits available from different manufacturers.

Such integrated remote control circuits comprise an input that can be coupled directly to the light detector (usually a photo diode). In the component U1 used here this input is formed by the two input lines I1 and I2. In conventional remote control receivers, a photo diode is placed between these two input lines. This photo diode is operated by the input stage of unit U1. If the photo diode is removed, the input stage of U1 is in an undefined state it was not designed for, and it is unable to process an input signal.

In the circuit of the appended FIGURE, the photo diode between I1 and I2 is therefore replaced by a conventional rectifier diode D1'. This diode D1' has similar current-voltage characteristics as the photo diode the input stage of U1 was originally designed for. Therefore, the input stage of the circuit U1 is forced by the diode D1' into its normal operating state and is ready to receive a signal.

The signals of the preamplifier are coupled into input I2 by means of the capacitor C3. In this way they arrive in the circuit U1 where they can be processed.

Therefore, it becomes possible to amplify the signal from the detectors prior to feeding it to the conventional integrated remote control circuit.

As is shown in the present embodiment, the signal from the detector can undergo additional filtering. For this purpose, any suitable filters can be used, such as blocking filter against the 50/60 or 100/120 Hertz frequency of AC operated illumination devices.

Furthermore, it becomes possible to operate the light detector under optimized conditions. In the shown embodiment the voltage over the photo diodes is e.g. chosen to be comparatively large (up to 18 Volts), which increases the signal strength.

It is also possible to use another kind of light detector, such as a fast photovoltaic cell, a light dependent resistor (LDR), a photomultiplier, etc.

In the shown preferred embodiment the signal from the preamplifier is coupled into the integrated circuit by means of a capacitor C3. It is, however, also possible to couple the signal in any other way known to a person skilled in the art. It is e.g. possible to use optical coupling (via an optical coupler or a similar device) or inductive coupling. When using an optical coupling, an optical coupler with a photo diode can be used, where the photo diode can simultaneously act as dummy load D1'.

In the circuit of the appended FIGURE, a rectifier diode D1' is used as a replacement load at the input of the integrated circuit U1. It is, however, also possible to use another kind of circuit as a replacement load. It should be observed, however, that within the voltage range and, if applicable, the frequency range the replacement load is operated, it has substantially the same voltage-current characteristic (impedance) as the predefined detector the integrated circuit was designed for. This is most easily achieved by using a rectifier diode, but it is also possible to use a photo diode, the base-emitter transition of a bipolar transistor, or another device with similar properties as a replacement load. It may even be possible to use other circuits for this purpose, such as constant current sources, constant voltage sources, a suitable resistor network, etc., especially when the range of operation (range of voltage and frequency) of the replacement load is comparatively narrow.

In all these cases the replacement load allows the input stage of the integrated circuit U1 to be forced into its operation state, such that an additional signal coupled into its input can be processed. Therefore it becomes possible to prepare the signal of the light detector in any suitable way before coupling it into the integrated receiver circuit U1.

While there is shown and described a presently preferred embodiment of the invention, it is to be distinctly understood that the invention is not limited thereto but may be otherwise variously embodied and practiced within the scope of the following claims.

I claim:

1. A remote control receiver, comprising:
    an integrated receiver circuit, wherein said receiver circuit is designed for processing received signals and comprises an input designed for a direct connection to at least one predefined light detector operating in a detector operating range;
    an input circuit, wherein an output signal of said input circuit is coupled to said input of said receiver circuit; and
    a replacement load applied to said input of said receiver circuit, instead of said at least one predefined light detector, said replacement load having substantial the same electric impedance as said at least one predefined light detector within said detector operating range.

2. The remote control receiver of claim 1, further comprising at least one light receiver, and wherein said input circuit is an analog preamplifier for amplifying signals from said at least one light receiver.

3. The remote control receiver of claim 2, wherein said input circuit comprises at least one filter means for suppressing noise signals.

4. The remote control receiver of claim 2, wherein said at least one light receiver is operated by a first operating voltage and said integrated receiver circuit is operated by a second operating voltage, said first operating voltage being larger than said second operating voltage.

5. The remote control receiver of claim 1, wherein said output signal of said input circuit is coupled capacitively into said input of said receiver circuit.

6. The remote control receiver of claim 1, wherein said output signal of said input circuit is coupled optically into said input of said receiver circuit.

7. The remote control receiver of claim 1, wherein said output signal of said input circuit is coupled inductively into said input of said receiver circuit.

8. The remote control receiver of claim 1, wherein said replacement load comprises at least one diode.

9. The remote control receiver of claim 8, wherein said predefined light detector is a photodiode and wherein said replacement load is a rectifier diode replacing said photodiode.

10. A remote control receiver, comprising:
    an integrated receiver circuit, wherein said receiver circuit comprises an amplifier, processing stages for analyzing received commands and an input designed for direct connection to a photodiode;
    a light receiver and a preamplifier amplifying a signal from said light receiver and generating a preamplifier output signal, said preamplifier output signal being coupled capacitively to said input of said integrated receiver circuit; and
    a rectifier diode directly applied to said input of said integrated receiver circuit instead of said photodiode.

* * * * *

UNITED STATES PATENT AND TRADEMARK OFFICE
CERTIFICATE OF CORRECTION

PATENT NO. : 5,592,155
DATED : January 7, 1997
INVENTOR(S) : Daniel Ehrenmann

It is certified that error appears in the above-indentified patent and that said Letters Patent is hereby corrected as shown below:

On the title page of the above-identified patent, at item [73], change the name of the Assignee from "T.L.E.E. Industrial Laser and Electronic Engineering" to --I.L.E.E. Industrial Laser and Electronic Engineering--.

Signed and Sealed this

Twentieth Day of May, 1997

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,592,155
DATED : January 7, 1997
INVENTOR(S) : Daniel Ehrenmann

It is certified that error appears in the above-identified patent and that said Letters Patent is hereby corrected as shown below:

[73] Assignee: I.L.E.E. Industrial Laser and Electronic Engineering, Switzerland Signed and Sealed this Tenth Day of July, 2001

*Attest:*

NICHOLAS P. GODICI
*Attesting Officer*   *Acting Director of the United States Patent and Trademark Office*